United States Patent [19]

Danzik

[11] Patent Number: 4,967,837
[45] Date of Patent: Nov. 6, 1990

[54] STEAM ENHANCED OIL RECOVERY METHOD USING DIALKYL AROMATIC SULFONATES

[75] Inventor: Mitchell Danzik, Pinole, Calif.

[73] Assignee: Chevron Research Company, San Francisco, Calif.

[21] Appl. No.: 331,453

[22] Filed: Mar. 31, 1989

[51] Int. Cl.$^5$ .................. E21B 43/22; E21B 43/24
[52] U.S. Cl. .................. 166/272; 166/273; 166/294; 166/303; 166/309; 252/8.554
[58] Field of Search .............. 166/272, 273, 274, 294, 166/303, 309; 252/8.554

[56] References Cited

U.S. PATENT DOCUMENTS

| | | | |
|---|---|---|---|
| 3,470,097 | 9/1969 | Lavigne et al. | |
| 4,086,964 | 5/1978 | Dilgren et al. | 166/272 |
| 4,161,217 | 7/1979 | Dilgren et al. | 166/252 |
| 4,393,937 | 7/1983 | Dilgren et al. | 166/272 |
| 4,445,573 | 5/1984 | McCaleb | 166/250 |
| 4,468,335 | 8/1984 | Chen et al. | 166/275 X |
| 4,532,993 | 8/1985 | Dilgren et al. | 166/303 |
| 4,556,107 | 12/1985 | Duerksen et al. | 166/272 |
| 4,576,232 | 3/1986 | Duerksen et al. | 166/274 |
| 4,607,700 | 8/1986 | Duerkson et al. | 166/303 |
| 4,609,044 | 9/1986 | Lau | 166/270 |
| 4,643,256 | 2/1987 | Dilgren et al. | 166/303 |
| 4,682,653 | 7/1987 | Angstadt | 166/303 |
| 4,699,214 | 10/1987 | Angstadt | 166/303 |
| 4,743,385 | 5/1988 | Angstadt et al. | 166/272 X |
| 4,769,161 | 9/1988 | Angstadt | 166/272 X |

FOREIGN PATENT DOCUMENTS 2196665  5/1988  United Kingdom .............. 166/272

Primary Examiner—George A. Suchfield
Attorney, Agent, or Firm—Burns, Doane, Swecker & Mathis

[57] ABSTRACT

A method of enhanced oil recovery using foam to improve the effectiveness of steam to mobilize viscous crude, either for steam stimulation in a single well or for steam drive between wells. The new surfactant composition used comprises alkyl aromatic sulfonates having an average molecular weight of from about 400 to about 600 and comprising at least 2 alkyl groups wherein one alkyl group is linear and has from 3 to about 30 carbon atoms and one alkyl group is a branched chain and has from 5 to about 25 carbon atoms as the effective agent for the steam foamer. The dialkyl aromatic sulfonates having linear and branched chain substitutes provide significant economic advantages over alkyl aromatic sulfonates having only branched chain substituted and provide significant performance advantages over alkyl aromatic sulfonates which do not contain branched chain alkyl groups.

19 Claims, 3 Drawing Sheets

STEAM ENHANCED OIL RECOVERY METHOD USING DIALKYL AROMATIC SULFONATES

FIELD OF THE INVENTION

The present invention relates to enhanced oil recovery from a petroleum-bearing formation. More particularly, it relates to an improved method of steam or gas stimulation, or drive, of petroleum from such a formation wherein a foam-forming surfactant is injected into a well along with the steam or gas.

It has been postulated that steam or gas and surfactant coact with formation fluids to form foam which tends to block highly permeable gas, or steam, channels that may cause "fingering" or "gravity override", of the steam or gas through the formation. In a mature steam drive, residual oil saturations ($S_{or}$) are frequently less than 15% in the highly permeable steam override zones or isolated channels. In these circumstances, it is desirable to divert the steam from the high permeability channels at low oil saturation into the less permeable zones at high oil saturation levels. The best foaming surfactant in these cases foams to provide resistance to flow in the oil depleted zones, but does not foam and block access to the zones at high oil saturation levels. An example of a surfactant with these properties is provided by U.S. Pat. No.4,556,107. In other cases, there are high permeability channels that become resaturated by oil gravity drainage or there are override zones with oil saturation levels which are higher than those found in mature steam floods. For improved steam mobility control and enhanced oil recovery in these circumstances, it is desirable to use a foaming surfactant which foams both at low oil saturation levels and at relatively high oil saturation levels. Accordingly, this invention most particularly relates to improving blocking of gas or steam permeability channels where the residual oil content of the fluid passageways is relatively high by use of surfactants which preferentially foam not only in oil-depleted passageways, but also in formations containing 15% or more residual oil. Such foaming serves to provide steam mobility control and improve oil recovery from the high permeability streaks and to divert steam into the surrounding areas to increase oil mobilization and oil recovery from the oil-rich portions of the reservoir.

It is a particular object of this invention to inject into a petroleum-bearing formation a foam-forming surfactant composition in a water solution which substantially more effectively blocks highly permeable gas, or steam channels in the presence of substantial amounts of residual oil. Such foaming composition not only mobilizes the residual oil as it blocks the gas permeable portion of the reservoir, but effectively enhances steam or gas contact of the oil-rich, less-permeable, petroleum-bearing portions of the formation.

BACKGROUND OF THE INVENTION

Steam stimulation of petroleum-bearing formations, or reservoirs, has become one of the preferred methods of enhanced oil recovery. This is because steam is cost-effective to supply heat to low-gravity, high viscosity oils. Heat reduces resistance of oil flow from a reservoir to a producing well over a wide range of formation permeabilities. Further, such steam injection enhances the natural reservoir pressure, above that due to the hydrostatic head, or depth-pressure gradient, to increase the differential pressure between oil in the reservoir and the producing well bore.

The producing well may be the same well through which steam is periodically injected to stimulate petroleum flow from the reservoir (popularly called "huff and puff"). Alternatively, one or more producing wells may be spaced from the injection well so that the injected steam drives petroleum through the reservoir to at least one such producing well.

Almost all earth formations forming petroleum reservoirs are created by sedimentary deposition, with subsequent compaction or crystallization of the rock matrix. Such deposition of detrital materials, with varying composition and over extensive geological times, occurs at varying rates. The resulting compacted rocks in which petroleum accumulates are permeable, but in general the flow paths are quite heterogeneous. Accordingly, a petroleum reservoir formed by such rock formations are inherently inhomogeneous as to both porosity and permeability for fluid flow of either native (connate) or injected fluids. Furthermore, flow permeability for connate gas, oil and water is substantially different for each liquid or mixture. Because of these differences in permeability, it is now common practice to inject foam forming surfactants with the injected steam to block the more permeable gas passages that may develop in the formation. The desired result is to divert steam from the more permeable gas passageway to less permeable oil-rice zones of the reservoir. The foaming component is usually an organic surfactant material.

Another particular feature of such inhomogeneity of sedimentary rock formations appears to be their shale or clay content. It is known that such clay material is susceptible to alteration when contacted by water and particularly when the injected water is in the form of steam having little salt content. In general, clays have large surface area to volume ratios and when altered by water or steam tend to affect adversely contact between connate oil and reservoir rock. Most specifically, reservoirs containing viscous oils having organo-metallic and acidic components are particularly susceptible to both steam and surfactant materials used in enhanced oil recovery. Further, the solubility of surfactant in the connate water of the formation and the reservoir oil may have a deleterious effect on the foaming ability or stability of the foam where gas permeability and steam loss has increased by fingering or gas override. Thus, the foam may not be active where residual oil in the highly permeable channels exceeds more than a few percentage of the pore volume. Hence, there is a need for foam forming surfactant compositions which preferentially form foam in contact with residual oil within or around the steam- or water-permeable passageways of the formation, but without significant foam formation where they contact oil in oil-rich flow channels through the reservoir.

This invention is an improvement over prior methods of using foam-forming compositions to enhance petroleum production from oil-bearing formations. Many of these are mentioned and discussed in U.S. Pat. No. 4,086,964. Others include U.S. Pat. Nos. 4,393,937, 4,532,993 and 4,161,217. It is also an improvement over previously known methods of foam formation to control "fingering" or "over-ride" by injecting a foam-forming surfactant with gas or steam which primarily foams upon contact with residual oil portions of the reservoir created by gas or steam flow paths therethrough.

The need for surfactants which foam in the presence of both oil and water has been known for some time. Bernard ("Effect of Foam on Recovery of Oil by Gas Drive" Prod. Monthly 27, No. 1, 18-21, 1963) noted that the best foaming surfactants for immiscible displacements such as steam floods are those which foam when both oil and water are present. Dilgren et al. (U.S. Pat. No. 4,086,964) recognized the importance of noncondensable gas and added electrolyte such as sodium chloride for steam foams and discloses the use of an alkyl aromatic sulfonate, dodecylbenzene sulfonate, for this use. Other patents teach the use of alkyl aromatic sulfonates for this use without recognizing a difference in performance for the branched and linear structures (U.S. Pat. Nos. 4,532,993; 4,161,217 and 3,348,611). U.S. Pat. No. 4,161,217 teaches that mixtures of low molecular weight (300-400) and high molecular weight (400-600) alkyl aromatic sulfonates are useful foaming agents for hot water non-condensable gas foam drives. A still more recent patent, U.S. Pat. No. 4,562,727, teaches that olefin sulfonates such as alpha olefin sulfonates are substantial improvements over alkyl aromatic sulfonates. Copending application Ser. No. 07/055,148 filed May 28, 1987, now abandoned, discloses a class of branched alkyl aromatic sulfonates which offer substantial advantages over the surfactants of the prior art to produce better foaming behavior in the presence of varying amounts of residual oil. They are especially useful for improving oil recovery from reservoirs with high permeability zones containing varying amounts of residual oil having pore volume saturations of from a few percent to 30% or higher. Another recent patent, U.S. Pat. No. 4,682,653, discloses that when dialkylaromatic sulfonates are used in enhanced oil recovery methods, the para-isomer is preferred for thermal stability.

SUMMARY OF THE INVENTION

The present invention is directed to a composition for, and an improved process of, enhancing petroleum recovery from a petroleum reservoir using steam and involves injecting into the reservoir, along with such steam, a surfactant composition which upon injection is capable of coacting with such steam in the presence of residual or relatively depleted oil portions of the reservoir, to form a foam. Preferably the steam is at least partially wet to assist the formation of such foam in contact with residual oil.

The foaming composition used in this invention is an anionic surfactant comprising steam containing an effective amount of an alkyl aromatic sulfonate component having an average molecular weight of from about 400 to about 600 and comprising at least 2 alkyl groups wherein one alkyl group is linear and has from 3 to about 30 carbon atoms and one alkyl group is a branched chain and has from 5 to about 25 carbon atoms. Preferably this alkyl aromatic sulfonate component containing a linear chain and a branched chain alkyl groups has a molecular weight from about 450 to about 550 and more preferably about 475 to about 525. The foam forming alkyl aromatic sulfonate can be injected into a producing formation, either intermittently or continuously, and either in a water solution, or preferrably in mixture with or as an additive to wet steam. Desirably, such alkyl aromatic sulfonates are capable of interacting with the injected steam to form foam primarily in the residual oil portions of the reservoir formation and either block or mobilize residual oil in such permeability channels.

In preferred forms, the alkyl aromatic sulfonates useful in the method of this invention are those in the above molecular weight range and comprise (a) at least one branched alkyl group, having from 4 to 18 carbon atoms, which is attached to the aromatic component, such as benzene, toluene, or xylene, (b) at least one straight chain alkyl group having 8 to about 24 carbon atoms, which is attached to the aromatic ring, (c) and a sulfonate component which is also attached to the aromatic ring. These dialkyl aromatic sulfonates may be prepared by conventional alkylation and sulfonation processes. As used herein, the term "dialkyl aromatic sulfonate" means those aromatic sulfonates having at least two alkyl groups as defined, i.e., at least one branched chain alkyl group and at least one straight chain alkyl group.

The dialkyl aromatic sulfonates are preferably used in salt form, particularly salts of sodium, potassium, ammonium or other water-soluble cations. The preferred salt is sodium. However, acid forms of the sulfonates may also be used in the present invention.

Desirably, but not necessarily, the steam may include an injectable, non-condensable gas along with the surfactant composition. The non-condensable gas component may be injected continuously or at least periodically with the steam. Further, the gas may be miscible in the oil phase of the reservoir fluids. Such gas may be nitrogen, methane, flue gas, carbon dioxide, carbon monoxide or air. Further, the steam and the surfactant composition may be injected continuously into one well for producing oil from an adjacent Well penetrating the same reservoir. Alternatively, the steam including the foam-forming composition may be injected cyclically into one well and petroleum periodically produced from the same well.

Further objects and advantages of the present invention will become apparent from the following detailed description taken with the drawings which form an integral part of the present specification.

DESCRIPTION OF THE INVENTION

Figure 1:
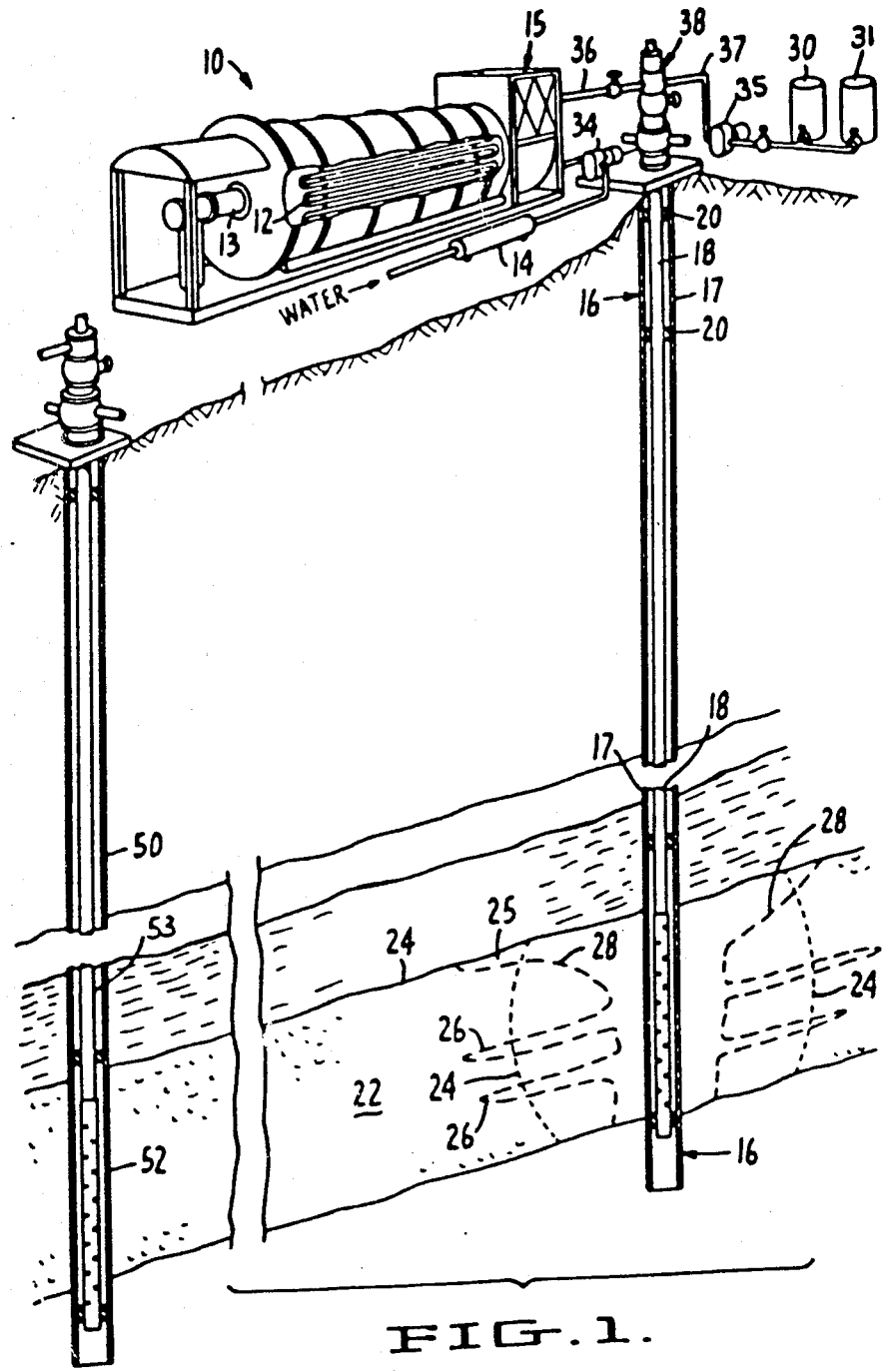
FIG. 1 is a schematic elevational representation of an injection well penetrating a petroleum reservoir formed by a sedimentary earth formation wherein steam is injected to reduce viscosity of the oil and a surfactant composition including the foam-forming component.

The present invention is, at least in part, based on the discovery that non-obvious and beneficial advantages are obtained by using a composition which includes using particular branched/linear dialkyl aromatic sulfonate surfactant components for foam-injection into a petroleum reservoir which are effective in the presence of steam to foam and mobilize residual oil in gas permeable passageways and are more economical than previously known surfactant compositions. An essential feature of using dialkyl aromatic sulfonate is its superior ability to foam where a substantial fraction of the flow paths contain residual oil, but substantially higher percentages of gas or steam, than other portions of a reservoir. The result of using such a composition in steam-assisted oil recovery is that the high permeability streaks in the reservoir channels which contain substantial volumes of residual oil are effectively plugged preferentially by the foam. Such preferential foam plugging diverts steam or gas flow through the formation to less permeable zones containing substantially higher oil concentrations. Accordingly, it will be noted that the present process has the beneficial effects of enhancing recovery of petroleum from petroleum reservoirs, by more rapidly forming foam in the presence of substantial amounts of residual oil to divert steam or gas from the more gas permeable, relatively oil-depleted zones, so that lesser volumes of gas increase oil flow from petroleum-rich, but less permeable, zones of the reservoir.

A particular feature of this invention is that the branched/linear dialkyl aromatic sulfonates of this invention are effective foaming blockers, but are substantially less costly than the alkyl aromatic sulfonates containing only branched alkyl groups. This invention thereby provides substantially lower cost methods for enhanced oil recovery and increased economic efficiency.

The dialkyl aromatic sulfonates useful in this invention are generally prepared by conventional alkylation and sulfonation processes, represented by:

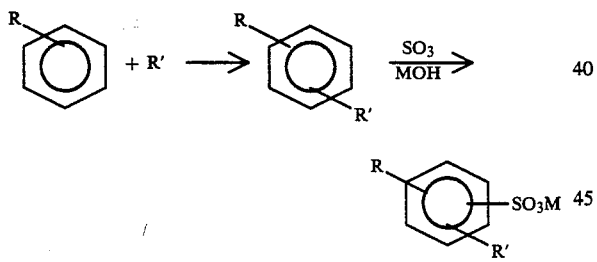

wherein at least one of R or R' is a straight chain alkyl group and at least one of R or R' is a branched alkyl group. The chain length of R and/or R' is from $C_3$ to $C_{30}$ and the sum of the chain lengths of R plus R' on the aromatic ring is from $C_{10}$ to $C_{40}$ preferably, about $C_{19}$ to about $C_{27}$. M can be Na, K, Ca, $NH_4$ and the like. Preferably the linear alkyl group is from about $C_8$ to about $C_{24}$ and the branched chain alkyl group is preferably from $C_5$ to about $C_{18}$. An example of the preparation of these dialkyl aromatic sulfonates include two-step alkylation of an aromatic, such as benzene, first with a branched substituent then with a linear substituent, followed by conventional sulfonation. This and other methods of preparation of similar linear/branched dialkyl benzene sulfonates are disclosed in U.S. Pat. No. 3,470,097, incorporated herein by reference.

The dialkyl aromatic sulfonates useful in this invention have average molecular weights of from 400 to 600. This number average molecular weight is calculated from the measured molecular weight of the precursor dialkyl aromatic moiety. There are 102 mass units ($SO_3$–Na—) added to the measured molecular weight determined by vapor pressure osmometry using toluene as the solvent (ASTM D-2503). Thus, the molecular weight of the dialkyl aromatic sulfonates are based on sodium as the cation. Adjustments for other cations can readily be calculated by those skilled in the art.

As the sum of the phenyl and sodium sulfonate groups have a molecular weight of about 180, the alkyl groups combined have an average molecular weight of from about 220 to 425. Thus the average of the sum of the number of carbon atoms in the alkyl groups are approximately 15 to 31. Preferably, this average sum of carbon atoms is between 19 and 27, more preferably between 21 and 25 carbon atoms.

Trialkyl aromatics such as dialkylated toluenes, cumenes and the like are also useful in this invention.

The dialkyl aromatic sulfonates useful in this invention have at least 2 alkyl groups. One of these alkyl groups is a linear alkyl group having 3 to about 30 carbon atoms.

The preferred linear alkyl group is derived from a linear alpha olefin such as those sold by Chevron Chemical Company, San Francisco, Calif. Alkylation of the aromatic moeity with the alpha olefin results in the linear alkyl group. Preferred alkylation catalysts are acid catalysts.

By "linear alkyl group" is meant an alkyl group having mostly secondary carbon atoms (—$CH_2$—). Typically, the linear alkyl group has at least one branch point (at the point of attachment to the aromatic moiety). The linear alkyl group can also have some additional branching. However, the degree of branching is such that the linear alkyl group is substantially straight chain, that is, greater than 80 number percent of the individual carbon atoms in the alkyl substituent are either primary ($CH_3$—) or secondary (—$CH_2$—) carbon atoms, preferably, greater than 85 percent.

Examples of preferred linear alkyl groups useful in this invention include:

| | |
|---|---|
| n-octyl | n-hexadecyl |
| n-nonyl | n-octadecyl |
| n-decyl | n-nonadecyl |
| n-undecyl | n-eicosyl |
| n-dodecyl | n-heneicosyl |
| n-tridecyl | n-docosyl |
| n-tetradecyl | n-tricosyl |
| n-pentadecyl | n-tetracosyl |

The other alkyl group of the dialkyl aromatic sulfonates of this invention is a branched alkyl group.

By "branched alkyl group" is preferably meant an alkyl group having at least one branch of 1 (methyl), 2 (ethyl) or more carbon atoms for every 3 carbon atoms along the longest chain of the alkyl group. Thus, in preferred branched alkyl groups, the number of carbon atoms in the longest chain is divided by 3 (rounded down to the whole number) and there will be at least this number of branches in the chain. Branched alkyl groups useful in this invention may be more or less branched than the preferred, provided that they are sufficiently branched to provide the desired foam forming characteristics. For example, the branching may average as much as every 2 or 2.5 backbone carbons or as little as one branch every 3.5 or 4 backbone carbons.

Examples of preferred branched alkyl groups useful in this invention include those derived from propylene and butylene polymerizations such as dimers, trimers, tetramers, and higher molecular weight oligomers. Preferred branch alkyl groups include propylene dimers, trimers and tetramers, polyisobutylenes and other polybutenes.

The dialkyl aromatic sulfonates useful in this invention may be relatively pure compounds or mixtures of compounds. Mixtures of compounds are preferred. The composition of the dialkyl aromatic sulfonates depends on the composition of the alkylating agent. Useful alkylating agents include alkyl halides and olefins; olefins are preferred.

The starting olefins used to alkylate the aromatic moiety may have a single carbon number or may be a mixture of carbon numbers. For example, a $C_{18}$ alpha olefin may contain a few percent of $C_{16}$ and $C_{20}$ compounds.

Often, mixtures of olefin isomers are used to alkylate the aromatic moiety. Typically, commercially available alpha olefins are mixture of isomers which include alpha olefins, vinylidene olefins and internal olefins.

In most cases, the dialkyl aromatic sulfonates useful in this invention are prepared from a mixture of olefin isomers having a range of carbon numbers. Moreover, the aromatic alkylation reactions used to make these sulfonates are acid catalyzed, resulting in some rearrangements and some cracking of both the starting materials and the products. Thus, the dialkyl aromatic sulfonates useful in this invention are almost always mixtures of compounds.

Representative dialkyl aromatic sulfonates useful in this invention include:

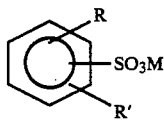

wherein R is a $C_3$ to $C_{30}$ linear alkyl group, preferably such as that derived from a $C_8$ to $C_{24}$ alpha olefin or a mixture thereof, and wherein R' is a $C_5$ to $C_{25}$ branched alkyl group, preferably such as that derived from a propylene dimer, trimer or tetramer or from an isobutylene dimer or trimer.

Preferred dialkyl aromatic sulfonates for this invention can be prepared from a side product alkylate of propylene tetramer with benzene, which has a mixture of $C_4$ to $C_9$ branched chain alkyl groups. This branched chain alkylate is further alkylated with a straight chain $C_8$ to $C_{24}$ olefin and then sulfonated. This preparation not only provides a preferred dialkyl aromatic sulfonate but provides it at a particularly low cost due to the low cost of the above side product alkylate. The dialkyl aromatic sulfonates useful in this invention can also be prepared when desired from the propylene tetramer alkylate itself, which typically has a $C_{12}$ branched chain alkyl, by alkylating with a linear olefin, such as a $C_{12}$ linear olefin to produce a $C_{12}$ branched/$C_{12}$ linear dialkyl aromatic suitable for sulfonation. When the side product containing $C_4$ to $C_9$ branched chain aromatic is alkylated with a $C_{18}$ olefin, the resulting product is the product used in the examples herein and is designated "$C_{18}LtAS$" or $C_{18}$ light alkane sulfonate. While other branched/linear dialkyl aromatic sulfonates may also provide the desired blocking performance, the $C_{18}LtAS$ gives good overall performance and is particularly preferred as cost effective because of its low cost of manufacture.

Preferably the sulfonate component is in the form of a sodium salt. Other salts such as potassium, ammonium or other water-soluble cations and mixtures thereof may be used. Additionally, the sulfonates may be in acid form of the dialkyl aromatic sulfonates useful in the practice of our invention.

The amount of dialkyl aromatic sulfonate useful in this invention is an amount effective to form the foaming desired in a particular formation. Typically the amount of sulfonate will be in the range of about 0.01 to about 10% by wt based on the liquid phase of the steam, and preferrably will be in the range of about 0.1 to about 5 wt %.

FIG. 1 illustrates schematically an arrangement for injecting the foam-forming surfactant composition of the present invention into an at least partially depleted oil reservoir where it is desirable to reduce the steam or gas permeability. As indicated, the invention is particularly directed to the problem of controlling steam injection into a producing formation to heat the petroleum and thereby reduce its viscosity. The steam may also increase pressure in the formation to enhance the natural gas or stratigraphic pressures to increase petroleum flow into the same well, or an adjacent well, penetrating the formation. For this purpose a steam generator 10 typically generates steam from water in a single-pass through a continuous boiler tube 12 heated by a gas or oil-fired burner 13. Water for steam generation is supplied by pump 34 and typically it will include minerals and salts which replicate or, are compatible with, connate water in the formation. Desirably, water may pass through a "water-softener", or ion exchange medium 14, and is heated in boiler tubes 12 sufficiently to form a low quality or "wet" steam, preferably having a quality of less than 80%. Such steam is injected into well 16 through well head 38 by steam pipe 36 out of heat exchanger 15. Steam is then injected into a pipe string 18 running down well casing 17. Pipe string 18 may be spaced as by centralizers 20 from casing 17 to prevent loss of heat from the steam to earth formations along the length of casing 17 to the desired injection depth, such as earth formation 24 forming reservoir 22.

The permeability of nearly all sedimentary earth formations which form petroleum reservoirs, such as 22, are inherently inhomogeneous to flow of connate fluids, water, oil and gas. Each of these fluids tends to flow selectively in permeability channels that have the least resistance to such flow. The resistance to flow of each fluid primarily depends upon its viscosity either alone or in mixed phase with the other fluids. Typically, the resulting or relative permeability of the flow paths for each fluid is different within each formation. Since gases are more mobile than either oil or water, or their mixtures, injected steam in general tends to flow through more permeable gas channels and may form "fingers" 26 in formation 22 as indicated by dotted lines. This gas flow by-passes "tighter" or less permeably zones wherein the oil-permeable passages are smaller or the oil is more tightly bound to the surface of the rock. In particular, the oil may also be in contact with clay or shale material with sand or carbonate components that form the permeable channels. Thus, "fingering" develops as indicated by channels 26, or "gas override" occurs as indicated by area 25 at the top of formation 22. Where these develop, energy is lost and large portions of the liquid oil are not heated by the injected steam.

With steam flow predominantly through lower permeability gas channels 25 and 26, the injection profile is distorted, as indicated generally by dotted line 28.

As discussed above, distortion of the injection profile may be corrected by addition of a foam-forming component to steam injection line 36. For this purpose, surfactant solution is supplied by tanks 30 and 31 through metering pump 35 and injection line 37. Foam may be created within the formation either by forming it with gas or steam within the steam supply line or upon contact with formation fluids. The foam so injected preferentially flows with the steam to gas-permeable channels 25, 26. It effectively plugs them temporarily so that steam in the formation is then diverted to heat the oil-rich portions of the formation. The desired result is indicated by the relatively piston-like movement of the steam front indicated by dotted lines 24.

However, a particular difficulty is forming and maintaining foam as a blocking agent in those steam or gas permeable channels arises where they contain substantial or significant amounts of residual oil, that is, in excess of a few percent. In particular, it has been found that previously known surfactants are not effective in reservoirs having a residual oil content of more than a few percent. In accordance with the present invention, I have found that the branched/linear dialkyl aromatic sulfonates are remarkably effective in forming foam in the presence of significantly higher percentages of such residual oil, say up to 30% or higher of the available pore volume.

In the present illustration, oil is produced from an adjacent producing well, such as 50, by a pump 52. It will also be understood that formation 22 may be cyclically heated by steam, and then periodically oil produced from injection well 16 through pipe 18 by rearranging well head 38 so that it supports a pumping unit similar to pump 52 on well string 53 in well 50.

The surfactant composition prepared in accordance with the present invention, is preferably supplied as a liquid solution and pumped as a foam forming concentrate from tank 30 for mixing with reservoir compatible water from tank 31. The solution is metered by pump 35 through line 37 at a desired rate to contact steam flowing in line 36 or pipe 18. Alternatively, the foam may be formed with gas from a gas source (not shown). Suitable gases may include nitrogen, flue gas, methane, carbon dioxide, carbon monoxide or air. Such gas would be added through well head 38 as by line 36.

Figure 2:
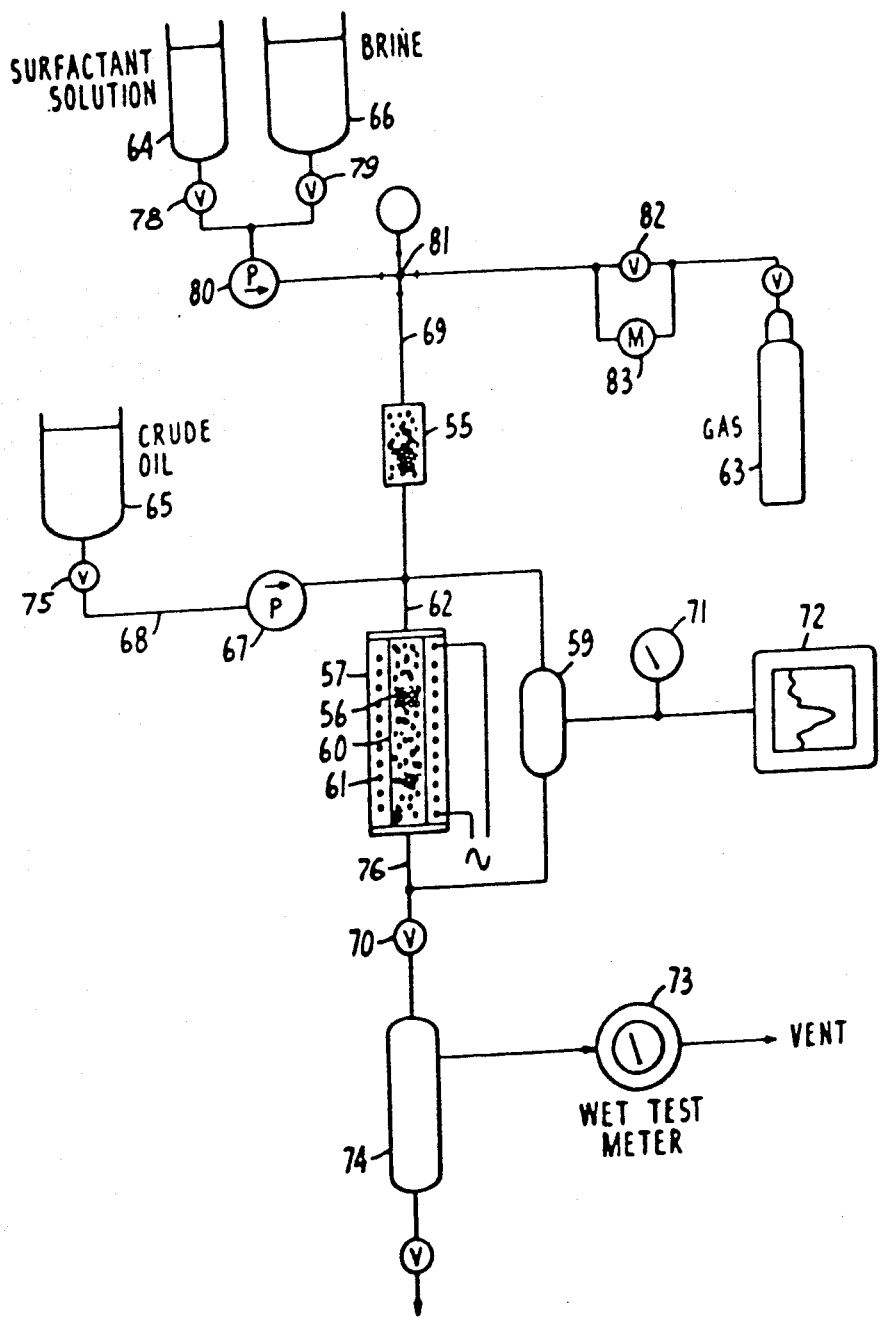
FIG. 2 is a schematic flow diagram of a test arrangement for generating foam in the presence of oil and water representative of connate fluids in a reservoir in which foam is formed for flow through a permeable core so that a surfactant forming such foam may be evaluated as to its usefulness to block steam permeable paths through oil-depleted or residual oil in a flooded-out core and to measure its resistance to foaming under varying liquid conditions in the core.
Figure 3:
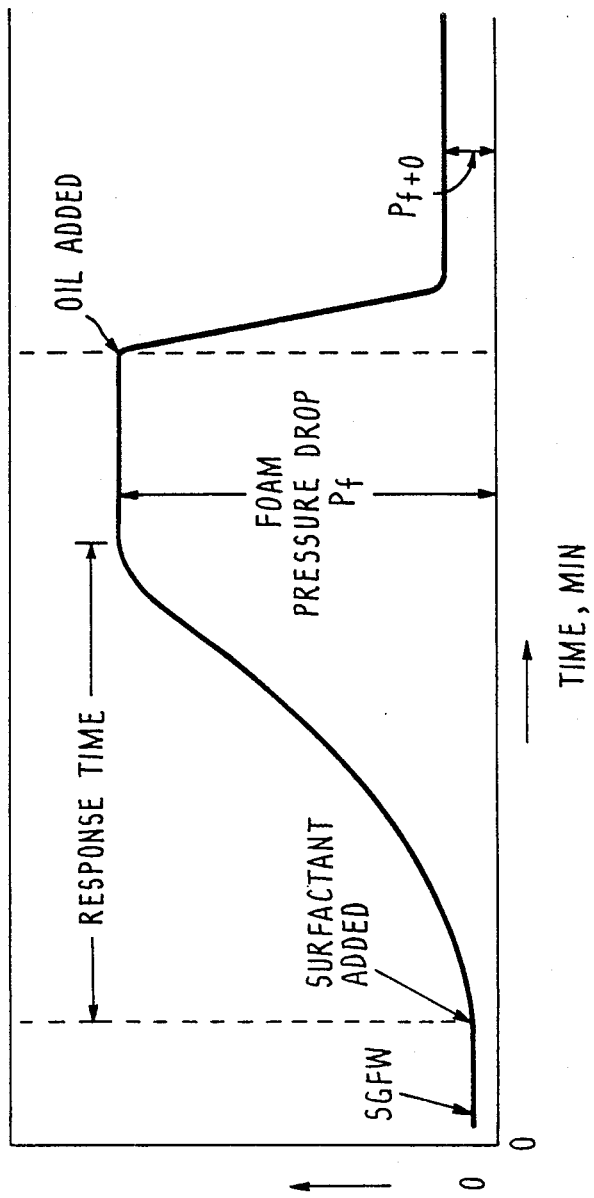
FIG. 3 is a graph of test results obtained with the test arrangement of FIG. 2 in a test according to Example 1 and illustrates a portion of a method of evaluating surfactant compositions as to their foam-forming capability and stability in the presence of residual oil and brine in the core.

FIG. 2 schematically illustrates test apparatus suitable for evaluating steam foam surfactant compositions and the compatibility of their foaming components in cores containing varying amounts of residual oil, to evaluate their effectiveness to form and maintain foams to block steam or gas flow. In this embodiment, the permeable oil-bearing reservoir rock sample or core is simulated by a steel wool pack 60, which can also be a sand pack. Such a core is disposed in an autoclave or visual pressure container 57 suitable for holding the core at reservoir temperatures, as by heater coil 61, and pressures. Heat may be added to the incoming fluids by preheater 55. Pressure may be applied by gas source 63, such as nitrogen. Temperatures on the order of 300° F. to 500° F. and pressures up to 1000 psi are provided. Fluids are then selectively supplied to the core under suitable flow conditions. The apparatus provides a source of steam generator feed water (SGFW) from Brine tank 66 under control of valve 79. Crude Oil from tank 65 is supplied through valve 75 and line 68 to pump 67. Inert Gas such as nitrogen from tank 63, creates flow through test core 60 under control of valve 82, as measured by flow meter 83. As indicated, these sources simulate reservoir brine and crude oil of a subject reservoir. The oil and brine act as displacing fluids. Selected surfactant solutions from tank 64 are added to brine from tank 66 and the mixture is supplied to the core through preheater 55 under pressure by pump 80. The surfactant materials from 64 may be introduced into the test system in selected quantities by valve 78. Differential pressure across core 60 is measured by DP cell 59 connected across inlet line 62 and outlet line 76. The detected pressure difference is desirably recorded as a time-pressure graph, as shown in FIG. 3, by recorder 72. Inert gas volumes are measured by wet test meter 73 connected to separator tank 74.

Steam-Foam Test

The steam-foam test consists of recording the pressure drop vs time, as detected by differential pressure cell 59. A selected foaming surfactant is tested by flow through test core 60 in cell 57 in which a steel wool plug is suitably run at about 400° F. and between 325 and 500 psig and a sand pack is suitably run at 350–450° F. and about 325 psig in the presence of flowing nitrogen.

A typical test sequence for a steel wool pack is illustrated in FIG. 2. The first step is to pass Steam Generator Feed Water (SGFW) from brine source 66 and oil, such as a representative crude from tank 65, together through core 60 until a substantially constant pressure drop vs time is recorded. As shown in FIG. 3, this is followed by flowing SGFW alone until steady state is again established. This puts the foam generator in a "Residual Oil" state. Pressure drop under these conditions is typically 0–2 psi.

Next, a surfactant composition from tank 64 which is to be tested is pumped through the system as a dilute solution in SGFW. With a good foaming composition, the pressure across the steel wool pack 60 increases over 15–100 min and levels off at a new steady state value (typically 20–100 psi); this condition is indicated in the section of the graph of FIG. 3 identified as foam pressure drop ($P_f$). The test then continues with introduction of oil along with surfactant composition. The measured pressure drop under these conditions is typically 2–20 psi ($P_{f+o}$). Finally, the surfactant solution is replaced with brine (SGFW) alone. Three performance parameters are measured: (1) The time required to reach a steady state pressure drop with foam (Response Time), (2) the steady-state pressure drop with the foam ($P_f$), and (3) the steady-state pressure drop with foam + oil ($P_{f+o}$). These performance parameters are labeled in FIG. 3. Large values for $P_f$ (FIG. 3) and low values for $P_{f+o}$ (FIG. 3) are desired where residual oil saturation is low. Surfactant compositions with these properties are able to increase the resistance to steam flow in high permeability zones of the reservoir where residual oil saturation is low; thus steam is redirected to portions of the reservoir where oil content is still high. This is typical of gravity override or steam channeling situations as shown in FIG. 1.

The Response Time and foam pressure ($P_f$) in FIG. 3 depend upon the surfactant and the residual oil in the foam (core) generator. In the absence of residual oil, the response time is very short with a pressure increase occurring as soon as the foaming surfactant contacts the foam generator. When residual oil is present, Response Time and $P_f$ depend upon how effectively the surfactant mobilizes and removes oil and how well the surfactant foams in the presence of oil. Foaming surfactants of the prior art which have been used in steam flooding to counteract override conditions with low residual oil behave as shown in FIG. 3; the pressure drop with foam + oil ($P_{f+o}$) is much lower than the pressure drop with foam alone ($P_f$), indicating the absence of foaming in the presence of oil. For circumstances where there are high permeability channels which contain oil from gravity drainage or there are override zones with oil saturation levels which are higher than those found in mature steam floods, the preferred performance is a rapid response with residual oil (short Response Time in FIG. 3), a high pressure drop with foam ($P_f$), and a substantial pressure drop with foam plus low levels of flowing oil (good $P_{f+o}$).

I have found the dialkyl aromatic sulfonates described herein to be a class of particularly economical surfactants which have the favorable combination of these properties including a rapid response rate with residual oil, a high pressure drop with foam ($P_f$), and a pressure drop with foam + oil ($P_{f+o}$). These surfactants offer the advantages of providing steam diversion and steam mobility control in override conditions and low residual oil saturation zones as well as in high permeability channels containing high residual oil levels. The following examples demonstrate these properties.

EXAMPLE A

This example illustrates the alkylation of a $C_{4-9}$ branched chain alkyl benzene (having an average molecular weight of about 150) herein called "light alkylate" with a $C_{18}$ straight chain olefin, 1-octadecene. The light alkylate is a by product from alkylation of benzene with propylene tetramer and is a lower boiling alkylate fraction. Typically it is a $C_4$-$C_9$ alkylate cut, averaging at about a $C_5$ to $C_6$ alkyl side chain.

A two liter round bottom flask was fitted with a stirrer, thermometer, nitrogen inlet, condenser, dropping funnel, and a heating mantle. The light alkylate, 187.3 g (1.25 m), was added to the flask under nitrogen, followed by 5.0 g of $AlCl_3$ (2 wt % based on the total olefin to be charged) with vigorous stirring. A solution of 375.4 g of the light alkylate (2.5 m) and 252,1 g (1.0 m) of 1-octadecene was added via the dropping funnel within 30 minutes, during which time the reaction temperature increased to 50° C. After an additional 188.8 g of light alkylate was added (1.26 m), the reaction mixture was stirred and heated at 50° C. for 2 hours.

The mixture was transferred to a separatory funnel, and after removal of the bottom "red oil" layer, the remainder was neutralized with 100 g of 10% NaOH. Extractions with 1 liter portions of water were carried out until the pH of the water was neutral, and the organic layer was then dried over $MgSO_4$. After filtration, the $MgSO_4$ was washed with 100 ml of hexane, the hexane filtrate was added to the reaction mixture, and a rotary evaporator was used to remove the hexane. Distillation of the reaction mixture was done through a five tray, one inch diameter, Oldershaw distillation column, at a 2/1 to 5/1 overhead reflux ratio. The initial vacuum was 35 mm which was decreased to 4 mm as the distillation progressed. The distillation was stopped at an overhead vapor temperature of 177° C. at 4 mm and a reflux ratio of 5/1. A bottoms product of 341.5 g was obtained.

EXAMPLE B

This example illustrates the sulfonation of the dialkylate obtained in Example A to give a $C_{18}$ LtAS.

Fifty grams of the above dialkylate bottoms product (0.123 m) was charged to a 100 ml jacketed turbomixer, and heated to about 60° C. $SO_3$ (11.8 g, 0.148 m) was added to the vigorously stirred dialkylate, via a syringe and a syringe pump, in about 1.25 hours. Prior to contacting the dialkylate, the $SO_3$ was vaporized and mixed with 9600 ml/min. of nitrogen at 72°-76° C. After all of the $SO_3$ was added, the mixture was stirred and purged with nitrogen for an additional 20 minutes. A sample of the sulfonic acid was removed and analyzed by a Hyamine titration (ASTM D3049) to give a 78.5% yield.

The acid was transferred to a 1 liter beaker, and vigorously mixed with 147 g of water followed by the addition of 31.2 g of 5 N NaOH. The slurry was allowed to stand overnight, during which time the pH dropped to 5.8. An additional 0.37 g of 5 N NaOH was added along with 9.77 ml of water, to achieve a pH of 9.66. The resulting slurry had a active sulfonate content of 22.7% as determined by a Hyamine titration.

EXAMPLE C

A $C_{16-24}$ LtAS was prepared by alkylating a $C_{4-9}$ branched chain alkyl benzene (light alkylate) with a linear $C_{16-24}$ olefin mixture having an average of about 19 to 20 carbon atoms, followed by sulfonation. Reaction conditions were similar to those in Examples A and B.

EXAMPLE D

A $C_{18-24}$ LtAS was prepared by alkylating light alkylate with a linear $C_{18-24}$ olefin mixture having an average of about 19 to 20 carbon atoms followed by sulfonation. Reaction conditions were similar to those described in Examples A and B.

EXAMPLE E

A $C_{12}$ LAB/$C_{12}$ BR was prepared by alkylating a linear dodecyl benzene with a propylene oligomer which is a branched chain $C_{5-24}$ olefin mixture having an average of about 12 carbon atoms, followed by sulfonation. Reaction conditions were similar to those described in Examples A and B.

EXAMPLE F

A $C_{16-C18}$ LtAS was prepared by alkylating light alkylate with a linear $C_{16-18}$ olefin mixture (weight %ratio 1:19), followed by sulfonation. Reaction conditions were similar to those described in Examples A and B.

EXAMPLES 1 and 2

Surfactants were compared in the steel wool pack foam test unit described above and depicted in FIG. 2. The foam flow tests were run in a ¼ inch diameter by 2¾ inch long steel wool foam generator at 400° F. and about 500 psi. The surfactants were tested at a liquid phase flow rate of 2 ml/min. with an active component concentration of about 0.5% by weight. The gas phase consisted of approximately equal volumes of steam and nitrogen at a combined approximate flow rate of 40 ml/min. at test conditions. The tests with flowing oil were run with 2 ml/min. surfactant solution or SGFW and 0.2 ml/min. of Kern River crude oil. The brine, or synthetic SGFW, was prepared by dissolving NaCl (295 mg/1), KCl (11 mg/1), $NaHCO_3$ (334 mg/1), and $Na_2SO_4$ (61 mg/1) in distilled water.

Surfactants were also compared in the sand pack foam test unit described above and depicted in FIG. 2.

The foam flow tests were run in a 1 inch diameter by 6 inch long sand pack foam generator at 350°–450° F. and about 325 psi. The surfactants were tested at a liquid phase flow rate of 1 ml/min. with an active component concentration of about 0.5% by weight. The gas phase consisted of approximately equal volumes of steam and nitrogen at a combined approximate flow rate of about 30 ml/min. at test conditions. The brine, or synthetic SGFW, was prepared by dissolving NaCl (295 mg/1), KCl (11 mg/1), NaHCO$_3$ (334 mg/1), and Na$_2$SO$_4$ (61 mg/1) in distilled water.

EXAMPLE 1

Table I shows the performance comparison of branched/linear dialkyl aromatic sulfonates with linear alkyl aromatic sulfonates—which were prepared under conditions similar to Examples A & B. These steel wool pack results show that the branched/linear dialkyl aromatic sulfonates of the present invention have the desired proportions of a fast response rate, a high foam pressure drop P$_{(f)}$, and significantly high foam pressure drop in flowing oil, P$_{(f+o)}$.

TABLE I

| | STEEL WOOL PACK TEST RESULTS | | | |
|---|---|---|---|---|
| EXAMPLE | MATERIAL | RESPONSE TIME, MINUTES | P$_f$ RESIDUAL OIL | P$_{(f+o)}$ FLOWING OIL |
| B | C$_{18}$ LtAS | <20 | 50 | 13 |
| — | ATS[1] | <20 | 55 | 2 |
| C | C$_{16-24}$ LtAS | <20 | 59 | 8 |
| E | C$_{12}$ LAB/C$_{12}$BR | <20 | 65 | 15 |

[1] ATS is a commercially available linear alkyl toluene sulfonate of similar molecular weight as C$_{18}$ LtAS, i.e., approx 500.

EXAMPLE 2

The following sand pack test results show that the branched/linear dialkyl aromatic sulfonates of the present invention have the desired properties of a fast response rate and a high foam pressure drop P(f), over a wide range of temperature and concentrations.

Table II shows the performance comparisons of branched/linear dialkyl aromatic sulfonates with linear alkyl aromatic sulfonates tested under similar conditions.

The characteristics of the foam generator used in the steam-foam test may change with time as the sand pack ages, or it is replaced. This may result in changing values for the parameters measured in this test. For this reason, the results shown for each grouping in Table II were tested on the same day as side by side comparisons. Reproducibility of foam blocking and response time measurements are generally within 10%–20%.

TABLE II

| | SAND PACK RESULTS: 30–40% RESIDUAL OIL | | | |
|---|---|---|---|---|
| EXAMPLE | MATERIAL | APPROXIMATE MINUTES TO WITHIN 5 PSI OF MAXIMUM P$_{(f)}$ | P$_f$ | TEMPERATURE F.° | CONCENTRATION WT % |
| B | C$_{18}$ LtAS | 40 | 97 | 400 | 0.5 |
| — | ATS | 80 | 106 | 400 | 0.5 |
| B | C$_{18}$ LtAS | 145 | 145 | 350 | 0.5 |
| — | ATS | 220 | 145 | 350 | 0.5 |
| B | C$_{18}$ LtAS | 80 | 30 | 450 | 0.5 |
| — | ATS | >>200 | <10 | 450 | 0.5 |
| B | C$_{18}$ LtAS | >500 | 85 | 400 | 0.25 |
| — | ATS | >500 | 45 | 400 | 0.25 |
| C | C$_{16-24}$ LtAS | 400 | 150 | 350 | 0.25 |
| — | ATS | 500 | 115 | 350 | 0.25 |
| D | C$_{18-24}$ LtAS | 190 | 73 | 400 | 0.5 |
| — | ATS | 215 | 70 | 400 | 0.5 |
| C | C$_{16-24}$ LtAS | 180 | 65 | 400 | 0.5 |
| D | C$_{18-24}$ LtAS | 210 | 65 | 400 | 0.5 |
| F | C$_{16-18}$ LtAS | 30 | 110 | 400 | 0.5 |
| B | C$_{18}$ LtAS | 25 | 110 | 400 | 0.5 |
| F | C$_{16-18}$ LtAS | 200 | 120 | 400 | 0.25 |
| B | C$_{18}$ LtAS | 200 | 120 | 400 | 0.25 |

Various modifications and changes in the surfactant compositions and their method of use to enhance recovery of oil from reservoirs undergoing steam stimulation will become apparent to those skilled in the art from the foregoing description of examples and their use. All such modifications or changes coming within the spirit and scope of the present invention are intended to be included within the scope of the claims defining the invention.

I claim:

1. A method of enhanced recovery of oil from a petroleum reservoir during steam injection into said reservoir which comprises:

periodically injecting steam and an anionic surfactant into said reservoir from a known depth interval in a well to form a foam in the presence of residual oil in high stem permeable channels of said formation, said anionic surfactant including an effective amount of an alkyl aromatic sulfonate component having average molecular weight of from about 400 to about 600 and comprising at least 2 alkyl groups wherein one alkyl group is linear comprising from about 8 to about 30 carbon atoms and one alkyl group is branched comprising from 5 to about 25 carbon atoms;

contacting the reservoir fluids in said formation with the resulting foam and said stem away from said injection interval to assist movement of said reservoir fluids toward a producing interval in said reservoir; and recovering oil from said producing interval.

2. A method in accordance with claim 1 wherein said alkyl aromatic sulfonate has a molecular weight of about 450 to about 550.

3. A method in accordance with claim 2 wherein the molecular weight is about 475 to about 525.

4. A method in accordance with claim 1 wherein the linear alkyl group comprises about 8 to about 24 carbon atoms and the branched alkyl group comprises 5 to about 18 carbon atoms.

5. A method in accordance with claim 4 wherein the linear alkyl group contains about 16 to about 24 carbon atoms and the branched alkyl group contains 5 to about 9 carbon atoms.

6. A method in accordance with claim 4 wherein the branched alkyl group contains about 12 to about 18 carbon atoms.

7. A method in accordance with claim 1 wherein said steam further comprises nitrogen, methane, flue gas, carbon dioxide, carbon monoxide, or air.

8. A method in accordance with claim 1 wherein the aromatic component of said alkyl aromatic sulfonate comprises benzene.

9. A method in accordance with claim 1 wherein the aromatic component of said alkyl aromatic sulfonate comprises toluene.

10. A method in accordance with claim 1 wherein the aromatic component of said alkyl aromatic sulfonate comprises xylene.

11. A method in accordance with claim 1 wherein the sulfonate component of said alkyl aromatic sulfonate comprises a water-soluble salt form thereof selected from the group including sodium, potassium and ammonium.

12. The method of claim 11 wherein the water soluble salt of said sulfonate component comprises sodium.

13. The method of claim 1 wherein the sulfonate component of said alkyl aromatic sulfonate comprises the acid form thereof.

14. A method in accordance with claim 1 wherein the injection depth interval and the producing interval are in the same well.

15. A method in accordance with claim 1 wherein the alkyl aromatics sulfonate comprises an amount of at least about 0.01% by weight of the liquid phase of the steam.

16. A method according to claim 15 wherein the amount is from about 0.01% to about 5% by wt of the liquid phase of the steam.

17. A process for recovering hydrocarbons from a subterranean hydrocarbon bearing formation penetrated by at least one injection well and at least one production well, said process comprising:

forming a steam and alkyl aromatic sulfonate foam, said alkyl aromatic sulfonate having an average molecular weight of from about 400 to about 600 and comprising at least 2 alkyl groups wherein one alkyl group is linear comprising from about 8 to about 30 carbon atoms and one alkyl group is a branched chain comprising from 5 to about 25 carbon atoms;

passing said steam and alkyl aromatic sulfonate foam into said formation and away from said injected well to assist the movement of hydrocarbons toward a production well; and recovering hydrocarbons at said production well.

18. A process in accordance with claim 17 wherein the alkyl aromatic sulfonate has a molecular weight of about 450 to about 550.

19. A process in accordance with claim 18 wherein the alkyl aromatic sulfonate has a molecular weight of about 475 to about 525.

* * * * *